United States Patent
Heimrich

(10) Patent No.: US 11,219,993 B2
(45) Date of Patent: Jan. 11, 2022

(54) POWER TOOL

(71) Applicant: Black & Decker Inc., New Britain, CT (US)

(72) Inventor: Tim Heimrich, Bad Camberg (DE)

(73) Assignee: Black & Decker Inc., New Britain, CT (US)

(*) Notice: Subject to any disclaimer, the term of this patent is extended or adjusted under 35 U.S.C. 154(b) by 241 days.

(21) Appl. No.: 16/523,123

(22) Filed: Jul. 26, 2019

(65) Prior Publication Data

US 2020/0047321 A1 Feb. 13, 2020

(30) Foreign Application Priority Data

Aug. 13, 2018 (GB) .................................. 1813167

(51) Int. Cl.
*B25F 5/00* (2006.01)
*B25D 16/00* (2006.01)

(52) U.S. Cl.
CPC ............ *B25F 5/001* (2013.01); *B25D 16/003* (2013.01); *B25D 2250/165* (2013.01); *B25D 2250/201* (2013.01); *B25D 2250/221* (2013.01)

(58) Field of Classification Search
CPC ................... B25D 2250/195; B25D 2250/221
See application file for complete search history.

(56) References Cited

U.S. PATENT DOCUMENTS

| | | | | |
|---|---|---|---|---|
| 9,505,097 B2* | 11/2016 | Aoki | .................. | B25D 16/003 |
| 10,200,524 B2* | 2/2019 | Stock | .................. | H04B 1/385 |
| 10,493,611 B2* | 12/2019 | Ontl | .................. | B25D 17/24 |
| 2016/0089757 A1* | 3/2016 | Wirnitzer | .................. | B25F 5/00 173/2 |
| 2016/0354888 A1* | 12/2016 | Huber | .................. | B25F 5/001 |
| 2016/0375570 A1* | 12/2016 | Boeck | .................. | H02P 6/00 700/169 |
| 2017/0320205 A1* | 11/2017 | Schaer | .................. | B25D 16/00 |
| 2018/0043521 A1* | 2/2018 | Moessnang | .................. | B25F 5/00 |
| 2018/0099392 A1 | 4/2018 | Sunabe et al. | | |

FOREIGN PATENT DOCUMENTS

| | | |
|---|---|---|
| EP | 0673109 B1 | 12/1997 |
| EP | 2779418 A2 | 9/2014 |
| EP | 2760124 B1 | 7/2019 |
| JP | 2010173054 A | 8/2010 |
| KR | 20180010401 A | 1/2018 |
| WO | 15133082 A1 | 9/2015 |

OTHER PUBLICATIONS

GB Search Report dated Jan. 17, 2019 in corresponding application 1813167.2.

* cited by examiner

*Primary Examiner* — Eyamindae C Jallow
(74) *Attorney, Agent, or Firm* — Amir R. Rohani

(57) ABSTRACT

A power tool comprises a housing and an electric motor disposed in the housing. A rotary output is driven by the motor. Electronic sensor configured to sense operating parameters of the power tool includes a voltage sensor arranged to detect the voltage across the electric motor, a current sensor arranged to detect the current through the tool, and a speed sensor arranged to detect the angular velocity ω of the output spindle. Electronic control apparatus is configured to determine from the operating parameter output signals the torque M of the rotary output and control the angular velocity of the rotary output in response to the calculation of the torque of said rotary output.

15 Claims, 1 Drawing Sheet

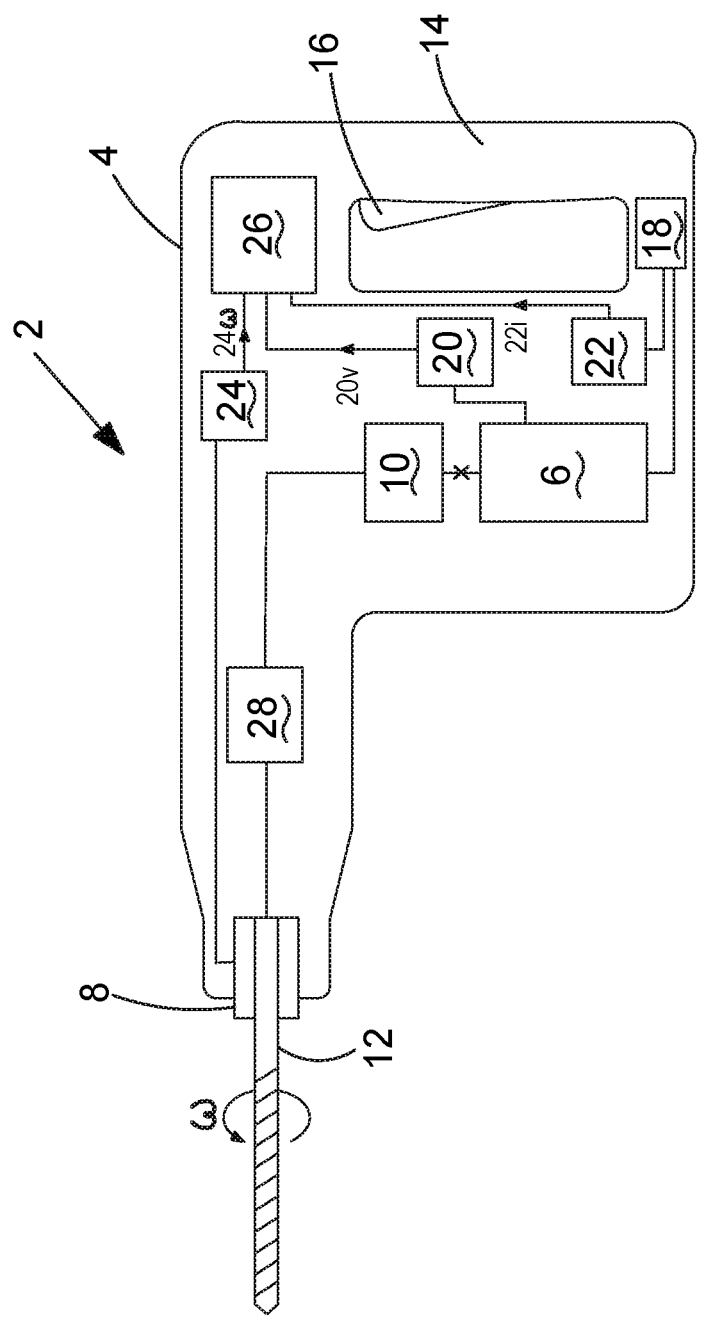

POWER TOOL

CROSS-REFERENCE TO RELATED APPLICATIONS

This application claims priority, under 35 U.S.C. § 119, to UK Patent Application No. 18 131 167.2 filed Aug. 13, 2018.

FIELD

The present invention relates to a power tool, and relates particularly, but not exclusively to a power tool comprising an electronic control apparatus. The present invention also relates to an electronic control system for a power tool.

BACKGROUND

Rotary power tools such as drills and hammer drills generally have clutch mechanisms to prevent damage to the tool and danger to the user if the bit becomes stuck when rotating. Both mechanical and electrical clutches are known which disconnect rotary drive from the bit when the torque encountered by the bit passes a predetermined threshold indicating that the bit is impeded or stuck. This is known as a blocking event.

EP1539434B1 describes various embodiments of mechanical and electronic clutches used in a rotary hammer drill. For example, one embodiment describes using an accelerometer to provide signals to a microprocessor which analyses acceleration of the tool housing to determine when a blocking event is occurring. The microprocessor can then provide a signal to operate an electromagnet which causes a mechanical clutch to actuate and disconnect drive from the motor to the spindle.

EP1539434B1 also describes a two-torque mechanical clutch. The two-torque mechanical clutch has two torque settings. A low torque setting is the default setting at which the clutch slips when the torque encountered by the bit exceeds a predetermined low torque threshold. However, a user can manually select a higher torque setting to increase the level of torque encountered by the bit at which the clutch slips. As a safety feature, after operation of the tool the clutch automatically defaults to the low torque setting to prevent the user initiating the tool in the high torque setting. The user must select the high torque setting during operation.

Electronic clutches are also known which measure the current being drawn by a power tool. When the current exceeds a predetermined threshold, the motor is turned off. This type of clutch suffers from the drawback that it does not take into account speed and mode settings of the tool.

SUMMARY

Preferred embodiments of the present invention seek to overcome the above disadvantages of the prior art.

According to an aspect of the present invention, there is provided a power tool comprising: a housing; an electric motor disposed in the housing; a rotary output driven by said electric motor; electronic sensing means configured to sense operating parameters of the power tool including the voltage across the electric motor, the current drawn by the power tool and the angular velocity of the rotary output and provide parameter output signals derived from said sensed operating parameters; and an electronic control apparatus configured to determine from said operating parameter output signals the torque of said rotary output and control the angular velocity of the rotary output in response to the calculation of the torque of said rotary output.

This provides the advantage of a power tool that is able to control the angular velocity of its rotary output by detecting the torque of the rotary output. This enables the power tool to have an electronic clutch that can be actuated at a predetermined level of torque. Since it is torque that is determined rather than current or acceleration of the housing, the detection of spurious blocking events can be minimised which means that the clutch does not slip at undesirable times for the user.

In a preferred embodiment, said electronic control apparatus determines the torque of said rotary output by calculating a function of a tool efficiency, the voltage across the electric motor, the current through the power tool and the inverse of the angular velocity of the rotary output provided by said operating parameter output signals.

This provides the advantage of a reliable means for calculating the torque of the rotary output.

In a preferred embodiment, said tool efficiency is provided to said electronic control apparatus from data in a look up table.

In a preferred embodiment, said electronic control apparatus is configured to continuously or discretely sample said operating parameter output signals to determine the torque of said rotary output of said power tool.

Said electronic control apparatus may be configured to reduce the angular velocity of the rotary output in response to the calculation of the torque of said rotary output by reducing the speed of the electric motor.

Said electronic control apparatus may be configured to switch off the electric motor in response to calculation of a torque exceeding a predetermined value.

Said electronic control apparatus may be configured to actuate clutch means to deactivate said rotary output in response to calculation of a torque exceeding a predetermined value.

The power tool may comprise a mechanical clutch configured to disconnect drive from the electric motor to the rotary output in response to the torque of said rotary output exceeding a predetermined threshold.

This provides the advantage of reducing the number of mechanical parts required for a two-torque clutch system.

According to another aspect of the present invention, there is provided an electronic control system for a power tool, the system comprising: electronic sensing means configured to sense operating parameters of a power tool in use, wherein said power tool comprises an electric motor and a rotary output driven by said electric motor and wherein said operating parameters include the voltage across the electric motor, the current drawn by the power tool and the angular velocity of the rotary output, wherein said electronic sensing means is configured to provide parameter output signals derived from said sensed operating parameters; and an electronic control apparatus configured to determine from said operating parameter output signals the torque of said rotary output and control the angular velocity of the rotary output in response to the calculation of the torque of said rotary output.

This provides the advantage of an electronic control system for a power tool that is able to control the angular velocity of the rotary output by detecting the torque of the rotary output. This enables the power tool to have an electronic clutch that can be actuated at a predetermined level of torque. Since it is torque that is determined rather than current or acceleration of the housing, the detection of spurious blocking events can be minimised which means that the clutch does not slip at undesirable times for the user.

In a preferred embodiment, said electronic control apparatus is configured to determine the torque of said rotary output by calculating a function of a tool efficiency, the voltage across the electric motor, the current through the power tool and the inverse of the angular velocity of the rotary output provided by said operating parameter output signals.

This provides the advantage of a reliable means for calculating the torque of the rotary output.

In a preferred embodiment, said tool efficiency is provided to said electronic control apparatus from data in a look up table.

In a preferred embodiment, said electronic control apparatus is configured to continuously or discretely sample said operating parameter output signals to determine the torque of said rotary output.

Said electronic control apparatus may be configured to reduce the angular velocity of the rotary output in response to the calculation of the torque of said rotary output by reducing the speed of the electric motor.

Said electronic control apparatus may be configured to switch off the electric motor in response to calculation of a torque exceeding a predetermined value.

Said electronic control apparatus may be configured to actuate clutch means to deactivate said rotary output in response to calculation of a torque exceeding a predetermined value.

BRIEF DESCRIPTION OF THE DRAWINGS

Preferred embodiments of the present invention will now be described, by way of example only and not in any limitative sense, with reference to the accompanying drawings in which:

FIG. 1 is a schematic of a power tool embodying the present invention.

DETAILED DESCRIPTION

Referring to FIG. 1, a power tool 2 comprises a housing 4 and an electric motor 6 disposed in the housing 4. A rotary output 8 is driven by the motor 6. In the embodiment shown, the power tool 2 is a hammer drill having a transmission 10 adapted to both rotate the rotary output 8 to rotate a bit 12 and also impart a reciprocal hammering action to bit 12 as will be familiar to persons skilled in the art. A mechanical clutch 28 is configured to disconnect drive from the motor 6 to the rotary output 8 when the torque M encountered by the rotary output 8 exceeds a predetermined threshold.

The power tool also comprises a handle portion 14 formed in housing 4 and a trigger 16 to enable a user input to drive the motor 6. A power source 18 is provided which may be either a battery or a corded connection to the mains as will be familiar to persons skilled in the art.

Electronic sensing means configured to sense operating parameters of the power tool includes a voltage sensor 20 arranged to detect the voltage across the electric motor 6, a current sensor 22 arranged to detect the current through the tool 2 and a speed sensor 24 arranged to detect the angular velocity ω of the output spindle 8. The electronic sensing means is therefore arranged to provide parameter output signals including voltage parameter output signal 20V, current parameter output signal 22i and rotary output speed parameter output signal 24ω to an electronic control apparatus 26.

The electronic control apparatus 26 is microprocessor based and is configured to determine from the operating parameter output signals 20V, 22i and 24ω the torque M of the rotary output 8. The electronic control apparatus 26 is also configured to control the angular velocity ω of the rotary output 8 in response to the calculation of the torque of the rotary output 8. The electronic control apparatus 28 is operable to change the angular velocity ω of the rotary output when a predetermined value of torque M is exceeded. For example, the motor speed may be reduced to reduce angular velocity. Alternatively, the motor 6 may be switched off or the electronic control apparatus 26 could provide a signal to actuate mechanical clutch 28.

The torque M of the rotary output 8 is calculated as set out below. In the following equations, the symbols used are as follows:

| Symbol | Quantity |
| --- | --- |
| i | current through the whole tool 2 |
| u | voltage across the motor 6 |
| ω | angular velocity of rotary output 8 |
| n | motor armature speed |
| M | torque of rotary output 8 |
| P | power |
| T | period time |
| μ | efficiency |
| N | Number of samples/line cycle |

It is known that the electrical power input into the power tool 2, $P_{el}$, is a function of voltage across the motor 6 and the current through the power tool 2. The electronic control apparatus 26 samples either continuously or discretely voltage parameter output signal 20v provided by voltage sensor 20 and current parameter output signal 22i provided by current sensor 22. When these parameter outputs are monitored continuously, the average power is provided by:

$$P_{el} = \frac{1}{T}\int_0^T u(t)i(t)dt$$

Where the current and voltage are sampled discretely at time intervals N, the average power is provided by:

$$P_{el} = \frac{1}{N}\sum_{m=0}^{N-1} u(m)i(m)$$

The angular velocity ω of rotary output 8 is determined by speed sensor 24 providing speed output parameter signal 24ω to the electronic control apparatus. It is known that the mechanical power output, $P_{mech}$, is equal to the product of the output torque and the angular velocity of rotary output 8:

$$P_{mech} = M\omega$$

The mechanical power output $P_{mech}$ is also equal to an efficiency factor μ multiplied by the electrical power to account for the power losses which incur internally within the power tool 2, for example friction in transmission 10, sound, vibration and heat. In the case of discrete sampling, this gives:

$$M\omega = \mu \frac{1}{N} \sum_{m=0}^{N-1} u(m)i(m)$$

The above equation can be rearranged to give an equation for the value of torque M in terms of current and voltage:

$$M\omega = \mu \frac{1}{N} \sum_{m=0}^{N-1} u(m)i(m) \longrightarrow M = \frac{\mu \sum_{m=0}^{N-1} u(m)i(m)}{N\omega};$$

$$\omega = 2\pi n$$

The efficiency μ of the hammer drill is determined in advance using a test rig and is programmed into electronic control apparatus 26 in the form of a look up table.

The mechanical clutch 28 can be entirely independent of the electronic control apparatus 26 and therefore a two-torque clutching system is provided. For example, mechanical clutch 28 in one embodiment is a high torque clutch which is operable at all times. The electronic clutch provided by electronic control apparatus 26 is a low torque clutch operable as a safety feature. During operation of the power tool 4, a user can deactivate the low torque electronic clutch provided by electronic control apparatus 26.

It will be appreciated by persons skilled in the art that the above embodiments have been described by way of example only and not in any limitative sense, and that various alterations and modifications are possible without departure from the scope of the invention as defined by the appended claims. For example, the electronic control system described can be used with any rotary power tool that requires a clutch, such as saws, routers etc. The electronic control system comprising electronic control apparatus 26 and electronic sensing means 20, 22, 24 could be provided as an upgrade to existing power tools.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
a housing;
an electric motor disposed in the housing;
a rotary output driven by said electric motor;
an electronic sensor configured to sense operating parameters of the power tool including the voltage across the electric motor, the current drawn by the power tool and the angular velocity of the rotary output and provide the parameter output signals derived from said sensed operating parameters; and
an electronic control apparatus configured to determine a torque of said rotary output as a function of the voltage across the electric motor, the current drawn by the power tool, the angular velocity of the rotary output, and a tool efficiency, and control the angular velocity of the rotary output in response to the torque of said rotary output.

2. A power tool according to claim 1, wherein said electronic control apparatus determines the torque of said rotary output as a function of an inverse of the angular velocity of the rotary output.

3. A power tool according to claim 1, wherein said tool efficiency is provided to said electronic control apparatus from data in a look up table.

4. A power tool according to claim 1, wherein said electronic control apparatus is configured to continuously or discretely sample said operating parameter output signals to determine the torque of said rotary output of said power tool.

5. A power tool according to claim 1, wherein said electronic control apparatus is configured to reduce the angular velocity of the rotary output in response to the calculation of the torque of said rotary output by reducing the speed of the electric motor.

6. A power tool according to claim 1, wherein said electronic control apparatus is configured to switch off the electric motor in response to calculation of a torque exceeding a predetermined value.

7. A power tool according to claim 1, wherein said electronic control apparatus is configured to actuate a clutch to deactivate said rotary output in response to calculation of a torque exceeding a predetermined value.

8. A power tool according to claim 1, further comprising a mechanical clutch configured to disconnect drive from the electric motor to the rotary output in response to the torque of said rotary output exceeding a predetermined threshold.

9. An electronic control system for a power tool, the system comprising:
electronic sensor configured to sense operating parameters of a power tool in use, wherein said power tool comprises an electric motor and a rotary output driven by said electric motor, wherein said operating parameters include: the voltage across the electric motor, the current drawn by the power tool, and the angular velocity of the rotary output, and wherein said electronic sensor is configured to provide the parameter output signals derived from said sensed operating parameters; and an electronic control apparatus configured to determine a torque of said rotary output as a function of the voltage across the electric motor, the current drawn by the power tool, the angular velocity of the rotary output, and a tool efficiency, and control the angular velocity of the rotary output in response to the torque of said rotary output.

10. An electronic control system according to claim 9, wherein said electronic control apparatus is configured to determine the torque of said rotary output as a function of an inverse of the angular velocity of the rotary output.

11. An electronic control system according to claim 9, wherein said tool efficiency is provided to said electronic control apparatus from data in a look up table.

12. An electronic control system according to claim 9, wherein said electronic control apparatus is configured to continuously or discretely sample said operating parameter output signals to determine the torque of said rotary output.

13. An electronic control system according to claim 9, wherein said electronic control apparatus is configured to reduce the angular velocity of the rotary output in response to the calculation of the torque of said rotary output by reducing the speed of the electric motor.

14. An electronic control system according to claim 9, wherein said electronic control apparatus is configured to switch off the electric motor in response to calculation of a torque exceeding a predetermined value.

15. An electronic control system according to claim 9, wherein said electronic control apparatus is configured to actuate a clutch to deactivate said rotary output in response to calculation of a torque exceeding a predetermined value.

* * * * *